United States Patent
Ilievski et al.

(10) Patent No.: US 10,293,718 B1
(45) Date of Patent: May 21, 2019

(54) MOTION CONTROL SEATING SYSTEM

(71) Applicants: Filip Ilievski, Foster City, CA (US);
John J. Baker, Campbell, CA (US);
Kathryn C. Zhou, Cupertino, CA (US);
Matthew E. Last, San Jose, CA (US);
Randol W. Aikin, San Francisco, CA (US); Donald J. Novotney, San Jose, CA (US); Stephen P. Zadesky, Portola Valley, CA (US)

(72) Inventors: Filip Ilievski, Foster City, CA (US);
John J. Baker, Campbell, CA (US);
Kathryn C. Zhou, Cupertino, CA (US);
Matthew E. Last, San Jose, CA (US);
Randol W. Aikin, San Francisco, CA (US); Donald J. Novotney, San Jose, CA (US); Stephen P. Zadesky, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 15/629,268

(22) Filed: Jun. 21, 2017

Related U.S. Application Data

(60) Provisional application No. 62/353,247, filed on Jun. 22, 2016.

(51) Int. Cl.
*B60N 2/54* (2006.01)
*B60N 2/02* (2006.01)
*B60N 2/90* (2018.01)

(52) U.S. Cl.
CPC .......... *B60N 2/546* (2013.01); *B60N 2/0244* (2013.01); *B60N 2/914* (2018.02); *B60N 2/99* (2018.02); *B60N 2002/0268* (2013.01)

(58) Field of Classification Search
CPC ............ B60N 2/546; B60N 2/54; B60N 2/99; B60N 2/914; B60N 2/0244; B60N 2002/0268
(Continued)

(56) References Cited

U.S. PATENT DOCUMENTS 3,664,454 A * 5/1972 Cottrell ..................... B60T 7/06
 180/273
6,786,544 B1 * 9/2004 Muraishi .................. B60N 2/36
 297/216.14

(Continued)

FOREIGN PATENT DOCUMENTS

DE 19910877 B4 1/2006
EP 0311993 B1 1/1995

OTHER PUBLICATIONS boseride.com, "Technology: Fast Powerful Precise", Seat Suspension Technology to Reduce Drive Back Pain, http://www.boseride.com/seat-suspension-technology, Date Unknown, Downloaded Mar. 14, 2016, 5 pp.

(Continued)

*Primary Examiner* — Mark R Wendell
(74) *Attorney, Agent, or Firm* — Young Basile Hanlon & MacFarlane, P.C.

(57) ABSTRACT

A seating system for a vehicle is disclosed. The seating system includes a support surface having a surface contour formed by first springs having fixed stiffness values, a frame, and second springs having adjustable stiffness values coupling the support surface and the frame. The first springs and the second springs together control motion of the support surface in relation to motion of the frame.

20 Claims, 6 Drawing Sheets

(58) Field of Classification Search
USPC .............................. 297/284.9, 284.2, 284.3
See application file for complete search history.

(56) References Cited

U.S. PATENT DOCUMENTS

| | | | |
|---|---|---|---|
| 7,068,178 | B2 | 6/2006 | Oh |
| 7,685,658 | B2 | 3/2010 | Lokhorst et al. |
| 7,704,217 | B2 | 4/2010 | Morrison |
| 8,095,268 | B2 | 1/2012 | Parison et al. |
| 8,548,678 | B2 | 10/2013 | Ummethala et al. |
| 8,602,449 | B2 * | 12/2013 | Kojima ................ B60R 21/207 |
| | | | 280/730.2 |
| 8,781,681 | B2 | 7/2014 | Parison, Jr. et al. |
| 9,193,284 | B2 * | 11/2015 | Line ...................... B60N 2/986 |
| 10,046,683 | B2 * | 8/2018 | Line ...................... B60N 2/504 |
| 2007/0246285 | A1 * | 10/2007 | Browne ................ B60R 7/043 |
| | | | 180/273 |
| 2008/0217977 | A1 * | 9/2008 | Aldrich ................ A47C 1/023 |
| | | | 297/284.3 |
| 2009/0218858 | A1 * | 9/2009 | Lawall ................ B60N 2/4235 |
| | | | 297/216.1 |
| 2011/0278425 | A1 | 11/2011 | Park |

OTHER PUBLICATIONS searsseating.com, "Active Suspension System", Sears Seating, Technology, Innovations, http://www.searsseating.com/technology/innovations/ Date Unknown, Downloaded May 16, 2016, 2 pp.
Churchill, Christopher B., et al., "Dynamically Variable Negative Stiffness Structures", Research Article, Materials Engineering, http://advances.sciencemag.org/content/2/2/e1500778.full-text.pdf+html, Feb. 19, 2016, 7 pp.

* cited by examiner

MOTION CONTROL SEATING SYSTEM

CROSS-REFERENCE TO RELATED APPLICATIONS

This application claims priority to U.S. Provisional Application Ser. No. 62/353,247, filed Jun. 22, 2106, and entitled "Motion Control Seating System," the contents of which are incorporated herein by reference.

FIELD

The application relates generally to seating systems for vehicles. More particularly, described embodiments relate to controlling occupant motion using seating systems.

BACKGROUND

Vehicle occupants can experience different types of motion that can cause physical discomfort. Vibration, for example, can negatively impact blood flow and nerve sensation of the vehicle occupant, particularly during driving periods having a long duration. Motion sickness is another common discomfort reported by vehicle occupants. Motion sickness is the result of discordant stimuli of the vestibular system and visual system, occurring, for example, when motion is felt, but not seen by the vehicle occupant, as is common when the occupant is reading a book or using a screened device as a passenger in the vehicle. Reducing or removing the effects of vibration and discordant stimuli can improve the overall comfort of vehicle occupants.

SUMMARY

This disclosure relates to motion control seating systems. One aspect of the disclosure is a seating system for a vehicle. The seating system includes a support surface having a surface contour formed by first springs having fixed stiffness values, a frame, and second springs having adjustable stiffness values coupling the support surface and the frame. The first springs and the second springs together control motion of the support surface in relation to motion of the frame.

Another aspect of the disclosure is another seating system for a vehicle. The seating system includes a support surface; a cushion coupled to the support surface and including bolsters having adjustable inflation levels; a frame; and springs having adjustable stiffness values coupling the support surface and the frame. The bolsters and the springs together control motion of the support surface in relation to motion of the frame.

Another aspect of the disclosure is another seating system for a vehicle. The seating system includes a support surface having a surface contour formed by first springs having fixed stiffness values; second springs having adjustable stiffness values coupling the support surface and a frame; a sensor operable to generate an output signal based on at least one of vibration information, vehicle information, occupant information, or external environment information; and a control unit operable to send a command to adjust the adjustable stiffness values of the second springs based on the output signal from the sensor.

BRIEF DESCRIPTION OF THE DRAWINGS

The description herein is made with reference to the drawings described below.

DETAILED DESCRIPTION

A vehicle occupant can experience motion sickness while riding in a vehicle. Motion sickness can be caused by low frequency vibrations, for example, between zero and two hertz. The vehicle occupant can also experience discomfort caused by moderate frequency vibrations, for example, between twelve and sixteen hertz. Vibrations in these ranges can be difficult to dampen using only a vehicle suspension since active control of the vehicle suspension is limited based on the natural resonance of the vehicle due to the vehicle's size and weight.

Existing methods of reducing motion sickness experienced by the vehicle occupant are inconsistent or ineffective. These methods range from pharmaceutical (e.g., taking medications such as antihistamines), to behavioral (e.g., looking out the vehicle window or adjusting a seating position), to structural (e.g., suspension design of the vehicle). Existing systems that reduce moderate frequency vibrations can create packaging space, weight, and/or power complications. For example, passive air springs and scissor-activated lift systems that isolate the seat from vibrations require a large amount of packaging space and add excessive weight to the vehicle. In another example, audio-based coils that counteract movement due to frequency vibrations require excessive amounts of power.

The seating systems described below can better control motion of a support surface, such as a seat base or a seat back, by working in conjunction with an active suspension system of the vehicle. The seating systems described below can reduce discomfort during longer duration rides and can reduce motion sickness in vehicle occupants that may be engaged in reading, working on a screened device, or watching a movie while in a moving vehicle.

Figure 1:
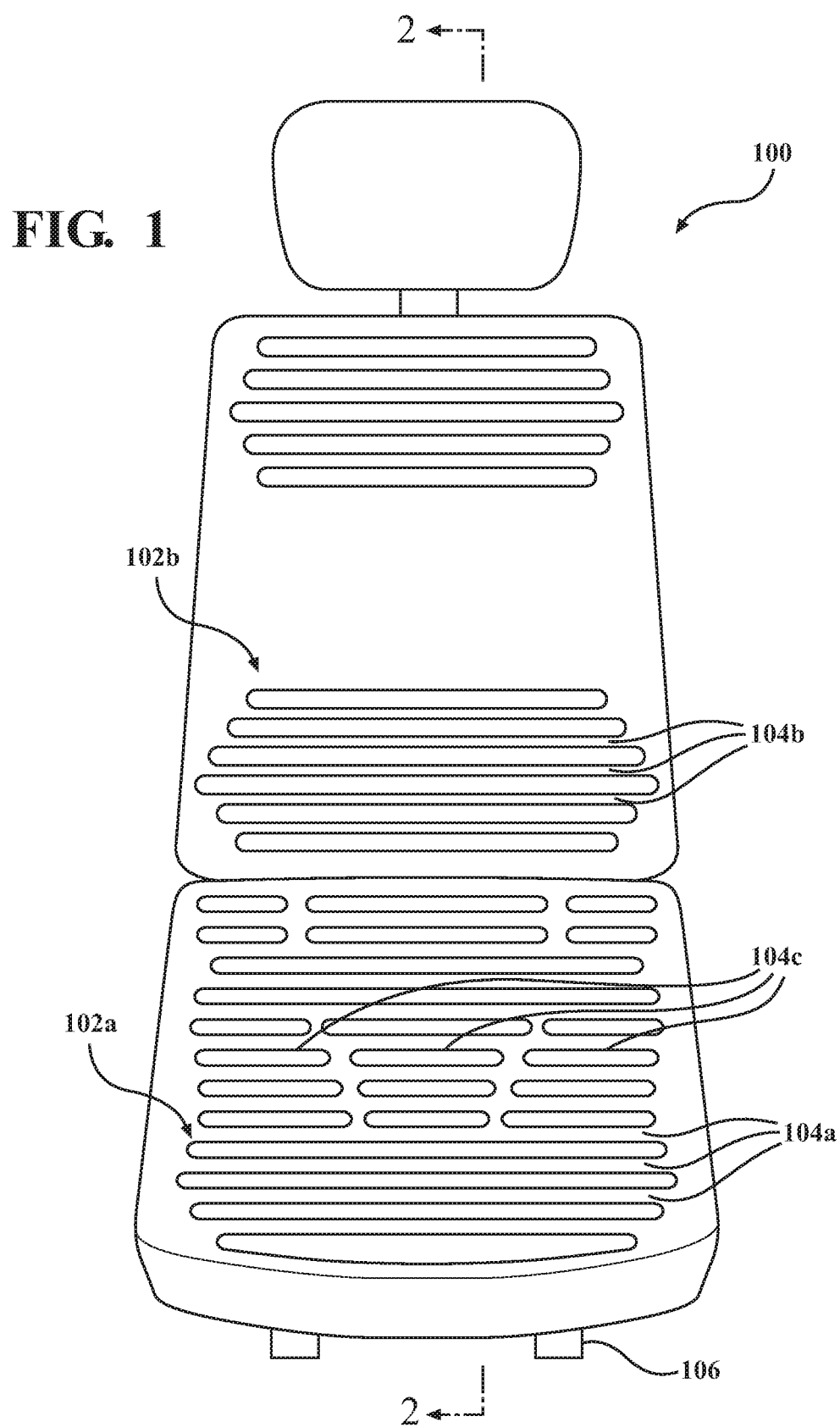
FIG. 1 is a perspective view showing a seating system for a vehicle.

FIG. 1 is a perspective view showing a seating system 100 for a vehicle. The seating system 100 includes support surfaces 102a,b designed to support a vehicle occupant. In this example, the support surface 102a is a seat base and the support surface 102b is a seat back. The support surfaces 102a,b can be formed of a variety of materials, such as polymers, metals, composites, and/or high-density foams. The support surfaces 102a,b can support the vehicle occupant directly or can be used with other materials to support the vehicle occupant. The support surfaces 102a,b have surface contours formed by sets of springs 104a,b,c having passive, that is, fixed stiffness values.

The springs 104a,b,c can be positioned, shaped, and tuned to optimize vibration isolation for a specific vehicle occupant, for example, a $50^{th}$ percentile occupant as designated by federal motor vehicle safety standards (FMVSS). Shaping the springs 104a,b,c to form the surface contour of the support surfaces 102a,b and selecting fixed stiffness values can also be based on other specific vehicle occupant shapes or sizes. Depending on the positioning, shaping, and tuning selected, lighter or heaver vehicle occupants being supported by the support surfaces 102a,b can change the resonant frequency of the springs 104a,b,c forming the support surfaces 102a,b and modify the vibration-minimizing characteristics of the seating system 100.

In the example of FIG. 1, the springs 104a,b,c are sets of leaf springs extending generally in series and/or parallel with each other to form the surface contours of the support surfaces 102a,b. The sets of springs 104a,b include individual springs that extend generally parallel to other individual springs in the sets from one side of the support surface 102a,b to the other side of the support surface 102,b. The set of springs 104c alternatively includes individual springs that extend generally in series with other individual springs in the set from one side of the support surface 102a to the other side of the support surface 102a. The layout or pattern chosen for the various sets of springs 104a,b,c will be based on characteristics of the vehicle occupant being supported.

Figure 2:
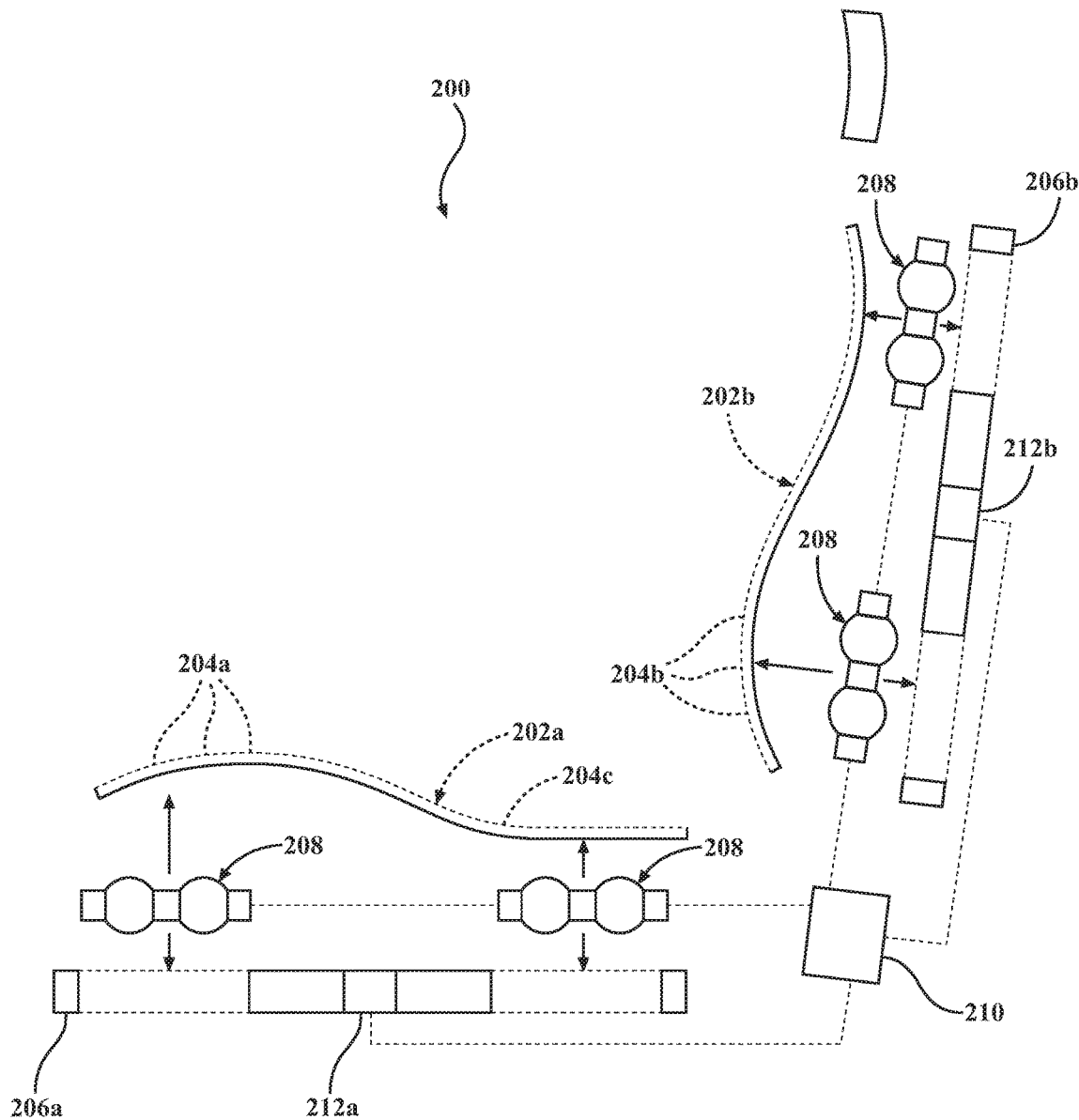
FIG. 2 is an exploded sectional view through the seating system of FIG. 1.

The support surfaces 102a,b formed by the springs 104a,b,c are coupled to a frame 106 as further described in reference to FIG. 2. The frame 106 serves as a load carrier, for example, in cases of vehicular impact, giving a robust structure to the seating system 100. The frame 106 can be designed to affix the seating system 100 to the vehicle such that vibrations from the vehicle transmit to the frame 106 and to the support surfaces 102a,b and the springs 104a,b,c before reaching the vehicle occupant.

FIG. 2 is an exploded sectional view through a seating system 200 as indicated in FIG. 1. The seating system 200 includes support surfaces 202a,b having surface contours formed by springs 204a,b,c, Here, the support surface 202a is a seat base and the support surface 202b is a seat back. The springs 204a,b,c are sets of passive, or fixed, stiffness leaf springs extending generally in series and/or parallel with each other to form the surface contours of the support surfaces 202a,b. In order to improve the anti-vibration performance of the seating system 200, the support surfaces 202a,b formed by the springs 204a,b,c are coupled to the frames 206a,b by spring systems 208 having adjustable stiffness values, that is, the spring systems 208 have stiffness values that can be varied, changed, or adjusted.

Use of the springs 204a,b,c having fixed stiffness values along with the spring systems 208 having adjustable or variable stiffness values enables dynamic adjustment of the seating system 200. This dynamic design can achieve significant improvements in vibration isolation of vehicle occupants from the frame 206a,b and the vehicle. The spring systems 208 having variable stiffness values can be implemented in parallel (as shown) or in series to the springs 204a,b,c having fixed stiffness values in order to actively adjust the overall stiffness of the seating system 200 and tune the resonant frequencies to minimize the transmitted vibrations into the vehicle occupant.

Achieving active vibration control for vehicle occupants can be based on combining the two mechanical systems (i.e., the support surfaces 202a,b formed by the springs 204a,b,c and the spring systems 208 coupling the support surfaces 202a,b to the frame 206a,b) with an electrical system. The electrical system can include a control unit 210 and various sensors 212a,b. In one example, the sensors 212a,b can be used to analyze the motion of various components within the seating system 200. The sensors 212a,b can include, for example, accelerometers, and motion information captured by the sensors 212a,b can be analyzed by a central processing unit of the control unit 210 to make a determination as to how to modify stiffness values of the spring systems 208.

In another example, the sensors 212a,b can include weight sensors. The weight sensors can be used to determine overall weight and distribution of weight for the vehicle occupant on the support surfaces 202a,b of the seating system 200. In one example, the vehicle occupant may be heavier than a design standard, and the stiffness values of the spring systems 208 can be increased to better support and isolate the vehicle occupant from vibrations, shifting the resonant frequency of the seating system 200 accordingly. In another example, the vehicle occupant may be lighter than a design standard, and the stiffness values of the spring systems 208 can be decreased or softened, shifting the resonant frequency of the seating system 200 accordingly.

The control unit 210, the spring systems 208 having adjustable stiffness values, and the various sensors 212a,b are small and can easily be packaged into a reasonable volume that can fit in a small sedan or similar sized vehicle. For example, and as shown in the exploded view of FIG. 2, the spring systems 208 and the sensors 212a,b can be packaged within rail-type elements of the frame 206a,b, with load bearing connections of the spring systems 208 being coupled to specific locations beneath the support surfaces 202a,b. The control unit 210 can be located at a juncture of the support surfaces 202a,b, as shown, or can be located remotely within the vehicle.

Figure 3:
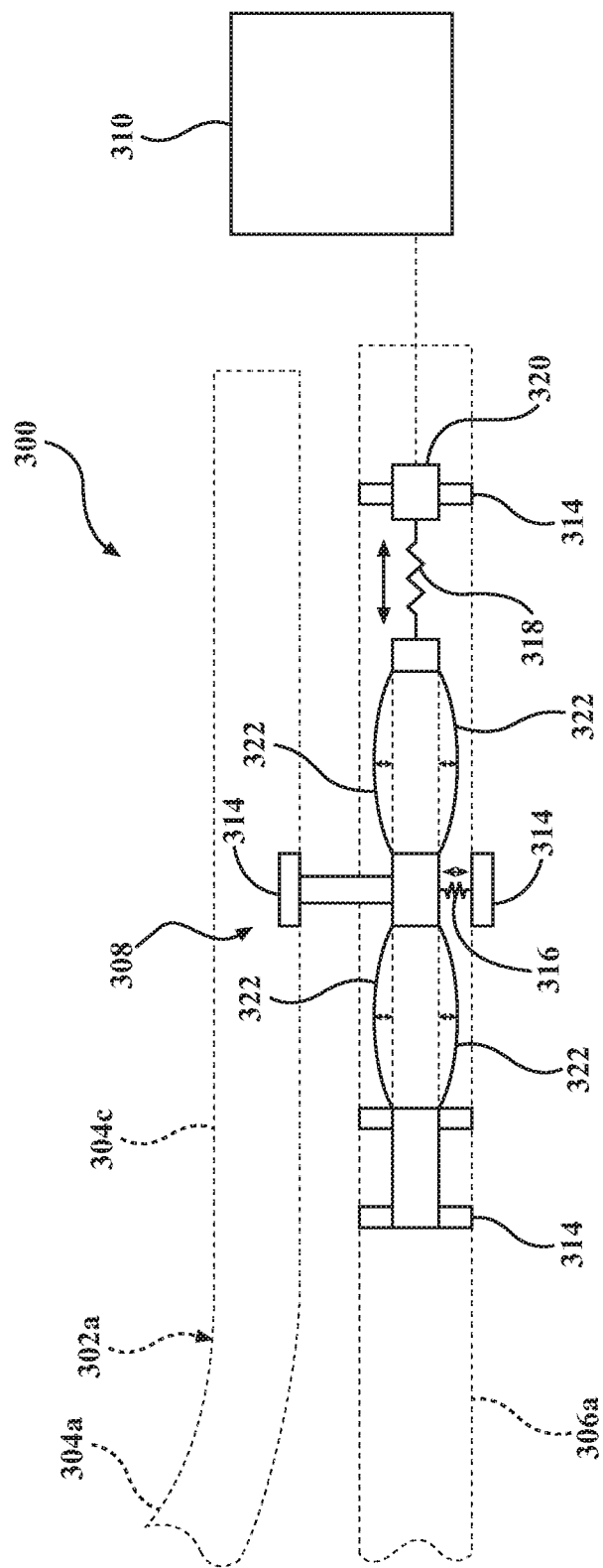
FIG. 3 is a partial detail view showing a spring system with variable stiffness for use with the seating systems of FIGS. 1 and 2.

FIG. 3 is a partial detail view showing a spring system 308 with variable stiffness for use with a seating system 300. The seating system 300 includes a support surface 302a for supporting a vehicle occupant. A surface contour of the support surface 302a can be formed, for example, by springs 304a,c having fixed stiffness values, where the springs 304a,c are similar to the springs 104a,b,c and 204a,b,c described in reference to FIGS. 1 and 2. The spring system 308 in FIG. 3 is shown as supported within internal structure of frame 306a. The spring system 308 can be coupled both to the frame 306a and to the support surface 302a by various anchors 314. The type or style of the anchors 314 can vary depending on the mechanical interfaces between the spring system 308, the frame 306a, and the support surface 302a. Alternatively, other coupling mechanisms can secure the spring system 308 to the frame 306 and the support surface 302a.

The spring system 308 in FIG. 3 is a negative stiffness or stiffness-correcting device. Near the center of the spring system 308, a generally vertically-extending spring 316 having a fixed stiffness value supports the weight of the vehicle occupant on the support surface 302a. The spring 316 can be compressed and decompressed as indicated by its adjacent arrow. At one end of the spring system 308, a generally horizontally-extending spring 318 acts in a perpendicular manner to the spring 316. The spring 318 can be compressed and decompressed as indicated by its adjacent arrow. The other end of the spring system 308 is held fixed, forming a cantilever.

The spring system 308 also includes an actuator 320 operable to compress and decompress buckling elements 322 based on commands received from a control unit 310. The actuator 320 can compress or decompress the spring 318, causing bodies of the buckling elements 322 to bend or change in curvature, with centers of the buckling elements 322 moving up and down as indicated by adjacent arrows depending on the compression of the spring 318. While being compressed (or decompressed), the preload of the spring 318 is adjusted, and in combination with the associated changes to the stiffness values of the buckling elements 322 based on the described bending, a variable stiffness value for the overall spring system 308 is achieved.

Stiffness values of the spring system 308 change in a non-linear manner, as the buckling elements 322 can be designed as bendable structures with directional instabilities. In other words, the spring 318 can be repositioned and the buckling elements 322 can be bent using the actuator 320 to achieve desirable stiffness properties. Combined with the damping effect of the passive springs 304a,c of the support surface 302a, the seating system 300 is able to quickly and effectively tune stiffness characteristics independent of the applied load (i.e., the weight of the vehicle occupant). The spring system 308 is an actively variable stiffness structure that can reduce vibrations transmitted from the road via the vehicle to the vehicle occupant. Reducing vibrations can reduce long-drive discomfort of vehicle occupants.

The control unit 310 can be designed to send commands to the actuator 320 based on output signals from various sensors associated with the seating system 300. For example, and as briefly described in respect to the sensors 212a,b of FIG. 2, sensors (not shown) operable to generate output signals utilized by the seating system 300 can include accelerometers that detect vibration in a relevant range (0.1-100 Hz) and send vibration information to the control unit 310. Sensors can also include weight sensors that determine a weight and weight distribution of the vehicle occupant on the support surface 302a and send occupant information to the control unit 310. Other types of sensors external to the seating system 300 can also generate output signals for use by the control unit 310. In another example, the control unit 310 can receive vibration information from a vehicle suspension system. The vibration information from the suspension system can indicate how vibration is being dampened directly by the vehicle suspension such that the seating system 300 can choose appropriate stiffness values for the spring system 308.

The control unit 310 can also receive output signals from sensors associated with vehicle navigation or autonomous control representative of external environment information. For example, in vehicles equipped with radar, LIDAR, and/or vision systems, nearby vehicles or other obstacles can be identified and tracked. Object information such as range, range rate, and classification can be weighed by the control unit 310. In one example, a proximate position and/or erratic dynamic behavior associated with a nearby vehicle or other object can indicate a need for change in vibration damping in the seating system 300 in order to notify the vehicle occupant. External environment information can also include, for example, local temperature and weather conditions, the time of day, visibility level, road conditions such as wet, dry, icy, or snowy, and other information relating to the external environment in which the vehicle operates.

Upon receiving the respective output signals from the various sensors, the control unit 310 can send commands to tune stiffness values of the spring system 308 to match an operation mode of the vehicle or react to an observed activity in the external environment. For example, a softer stiffness valued can be chosen during autonomous vehicle operation while the vehicle occupants are resting, reading, or sleeping. In another example, damping by the spring system 308 can be reduced or completely eliminated if external environment information indicates that one or more vehicle occupants needs to pay close attention to operation of the vehicle.

The seating system 300 can be designed to operate without input from a vehicle occupant, such that no controls are made available to the vehicle occupant. Alternatively, a set of commands or buttons can be made available to receive inputs that allow the vehicle occupant to modify the damping and support provided by the seating system 300. For example, in some cases the vehicle occupant may wish to experience road vibrations or experience a more intense, interactive ride. In some cases, the vehicle occupant may wish to experience some vibration as a soothing or massage sensation provided by the seating system 300.

Though the seating system 300 is described in reference to the negative-stiffness spring system 308, adjustable stiffness values can also be achieved using springs with switchable volume bladders. For example, increasing a volume in a switchable volume bladder will increase pressure of the included fluid (e.g. air, water) in order to provide an equivalent position of the support surface 302a. At the same time, the stiffness value will have changed, modifying the damping provided by the seating system 300. Both the switchable volume bladders and the repositionable buckling elements 322 described previously can be actuated at sufficient speed to dampen vibration inputs.

The above seating systems 100, 200, 300 address means to counteract vibration that causes general discomfort, for example, over longer duration trips within a vehicle. Other types of motion at different frequencies can cause motion sickness. The human vestibular system controls a vehicle occupant's response to roll, pitch, yaw, lateral acceleration, and longitudinal acceleration in the vehicle. Low frequency vibrations and oscillations are understood to be the largest contributors to motion sickness, with frequencies of approximately 0.2 Hz generating feelings of queasiness in vehicle occupants prone to experiencing motion sickness. Additional improvements to seating systems can be made to counteract and/or reduce these oscillations and vibrations as described below.

Figure 4:
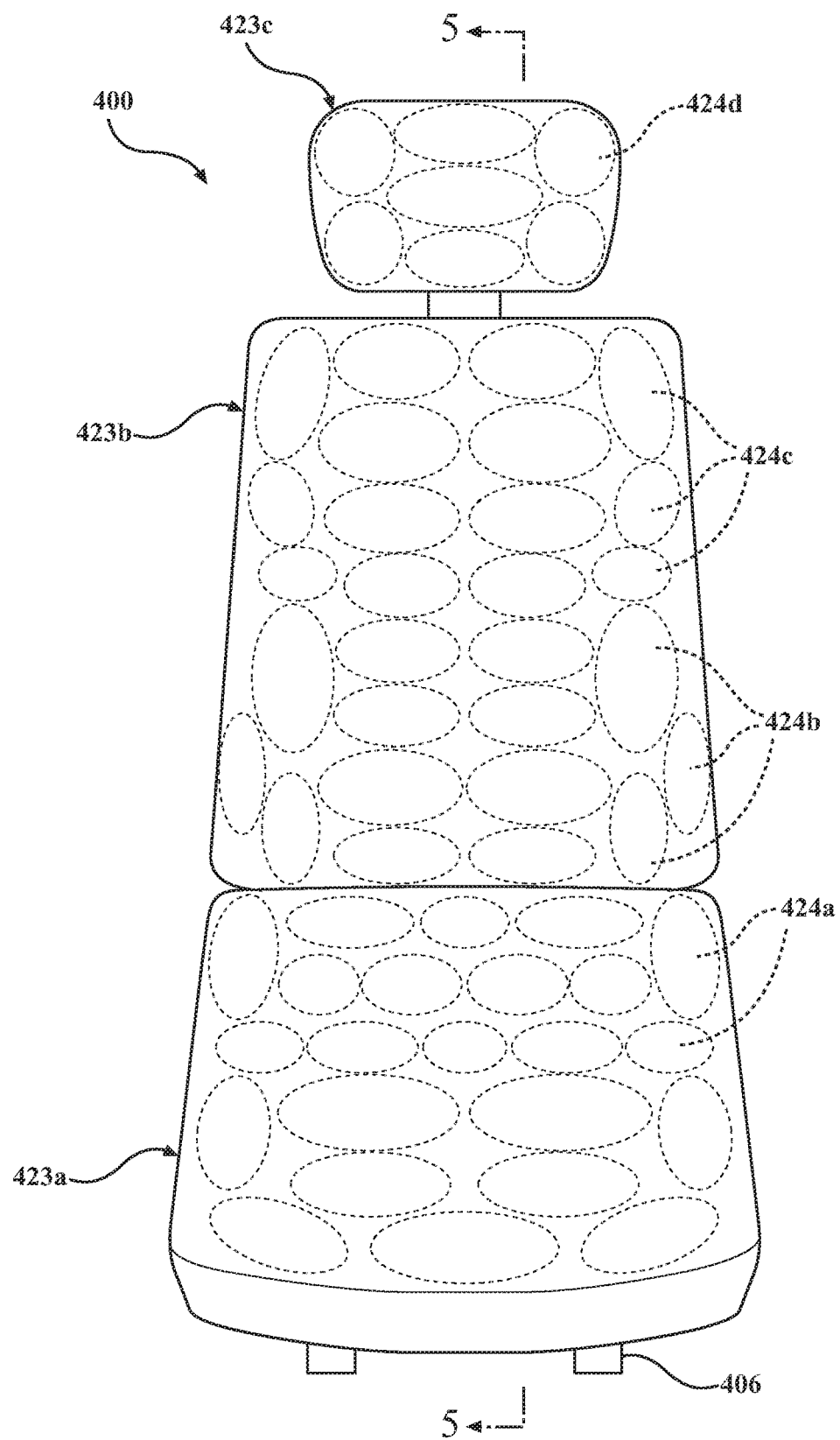
FIG. 4 is a perspective view showing another seating system for a vehicle.

FIG. 4 is a perspective view showing another seating system 400 for a vehicle. The seating system 400 includes cushions 423a,b,c designed to support a vehicle occupant. The cushions 423a,b,c can include outer surfaces formed of conventional seat cover materials (e.g. vinyl, leather, cloth) or any other suitable materials. Beneath the support surfaces, the cushions 423a,b,c can include bolsters 424a,b,c,d having adjustable inflation levels and arranged in a pattern allowing finely-tuned positioning of the vehicle occupant. The cushions 423a,b,c and the bolsters 424a,b,c,d can be used with both a conventional vehicle seat or in combination with the adjustable-stiffness, contoured support surfaces 202a,b and 302a described in FIGS. 2 and 3 above (and FIG. 5 below).

The bolsters 424a,b,c,d can be actuated independently, concurrently, or in an iterative pattern to counteract motion in the low frequency range, that is, frequencies under 2 Hz. In other words, inflation levels of the bolsters 424a,b,c,d can be modified either independently or in concert to anticipate and/or reduce the motion experienced by the vehicle occupant. Changes in inflation level of the bolsters 424a,b,c,d can be accomplished by pneumatic actuation. For example, a pump (not shown) or other source of gas (e.g., air) can work in conjunction with valves to control the inflation level within the bolsters 424a,b,c,d.

In one example, controlled inflation/deflation of the bolsters 424a in the seat base can counteract small vertical displacements of the vehicle occupant. In another example, controlled inflation/deflation of the bolsters 424b,c in the seat back can be used to counteract a rolling or yaw-type motion of the vehicle. In another example, controlled inflation/deflation of the bolsters 424d in the headrest can be used to counteract a pitching motion of the vehicle. The various bolsters 424a,b,c,d can be actively inflated/deflated either before (prediction) or after (treatment) motion sickness-inducing events. Changes in inflation levels of at least some of the bolsters 424a,b,c,d can be used to queue upcoming changes in vehicle motion, that is, physical stimuli can create an expectation of what motion changes are coming in the environment, to combat these changes, and to comfort the vehicle occupant after the motion occurs.

Figure 5:
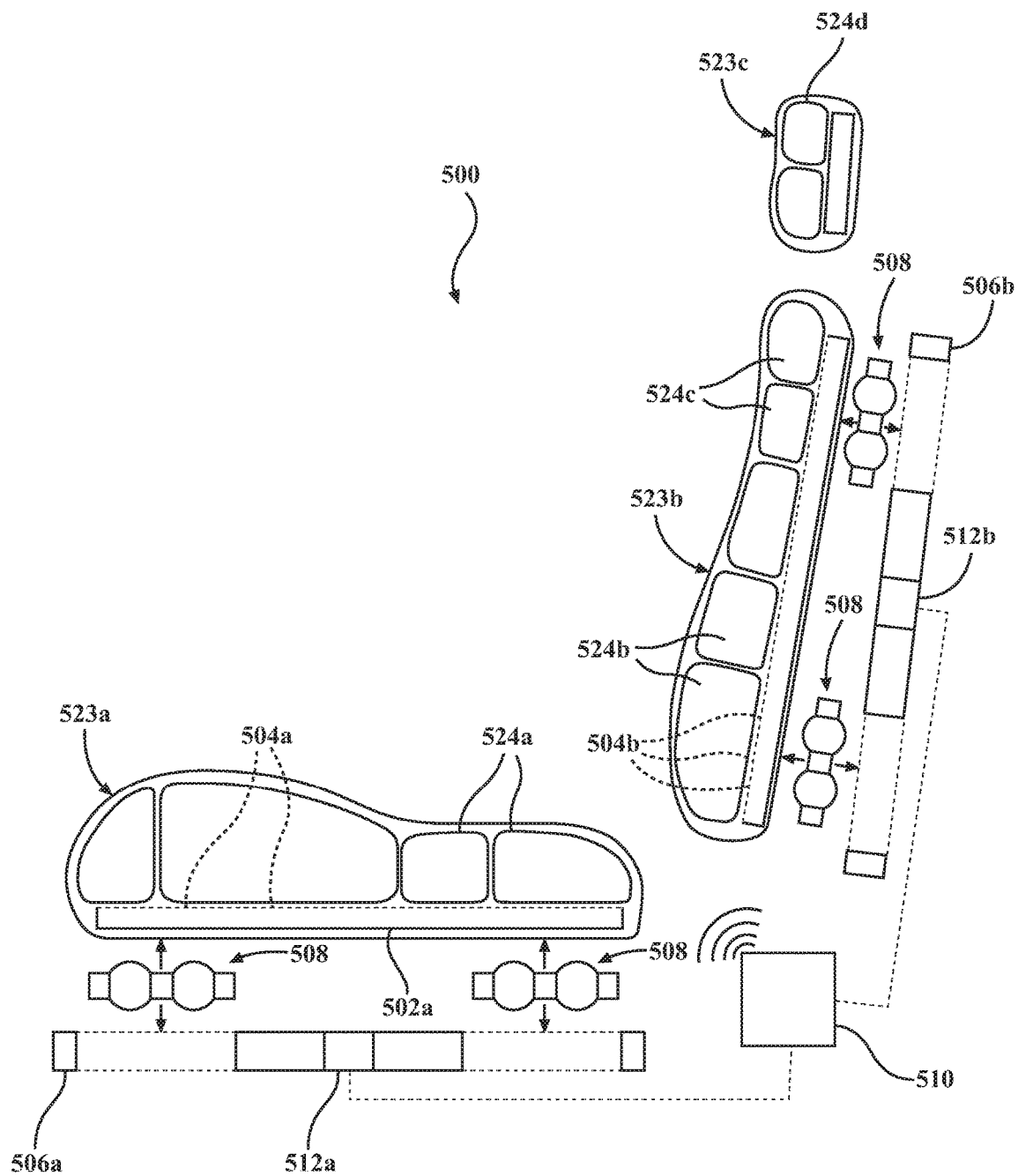
FIG. 5 is an exploded sectional view through the seating system of FIG. 4.

FIG. 5 is an exploded sectional view through a seating system 500 as indicated FIG. 4. The seating system 500 includes support surfaces 502a,b having surface contours formed by springs 504a,b, Here, the support surface 502a is a seat base and the support surface 502b is a seat back. The springs 504a,b can be leaf springs having fixed stiffness values that extend generally in series and/or parallel with each other to form the surface contours of the support surfaces 502a,b in a manner similar to that described in respect to the springs 204a,b,c of FIG. 2. The support surfaces 502a,b formed by the springs 504a,b can be coupled to frames 506a,b by spring systems 508 having adjustable stiffness values that are adjustable in a manner similar to that described in respect to the spring system 308 of FIG. 3.

The seating system 500 can include cushions 523a,b,c, and bolsters 524a,b,c,d having adjustable inflation levels. The cushions 523a,b,c can be coupled to the support surfaces 502a,b and the overall surface contour of the seating system 500 can be further formed by the cushions 523a,b,c. The seating system 500 can also include a control unit 510. The control unit 510 can be configured to send commands to actuate valves (not shown) to adjust inflation levels of the bolsters 524a,b,c,d, and the valves can either be located in the seating system 500 directly or can be located in a remote, centralized system.

The seating system 500 can include various sensors 512a,b in communication with the control unit 510. The sensors 512a,b can be used to analyze the motion of various components within the seating system 500. Output signals from the sensors 512a,b can be analyzed by a central processing unit of the control unit 510. The control unit 510 is operable to send commands to adjust inflation levels of the bolsters 524a,b,c,d as well as to send commands to adjust the stiffness values of the springs systems 508 based on the output signals from the sensors 512a,b.

The sensors 512a,b can be accelerometers or weight sensors similar to those described in reference to FIGS. 2 and 3. Other types of sensors external to the seating system 500 can also generate output signals for use by the control unit 510 of the seating system 500. For example, image sensors can be used to detect facial expressions, eye dilation, sweat, skin tone, swallowing frequency, posture, or other occupant information associated the vehicle occupant. This occupant information can be used to determine whether motion sickness is being experienced by the vehicle occupant or whether changes made to the bolsters 524a,b,c,d or the spring systems 508 of the seating system 500 have relieved symptoms of motion sickness.

In another example, vehicle sensors (e.g. LIDAR, radar, external cameras, GPS, etc.) can be used to determine future vehicle motion based on external environment information. Use of external environment information can support the control unit 510 sending commands to adjust inflation levels of the bolsters 524a,b,c,d in a pattern to provide a queue or indication to the vehicle occupant that changes in vehicle motion are expected. In another example, a restraint system (not shown) can include sensors such as accelerometers that detect gastrointestinal activity (e.g. stomach rumbling) of the vehicle occupant to determine if counteractive use of the bolsters 524a,b,c,d would reduce motion sickness.

The seating system 500 can be designed to operate in conjunction with an active suspension system of the vehicle to further filter vibrations or other motion experienced by the vehicle occupant. For example, vibration information and vehicle information such as steering angles, yaw rate, acceleration rate, etc. of the vehicle can be sent to the control unit 510 for use in adjusting inflation levels of the bolsters 524a,b,c,d. Implementation of the described seating system 500 can be automatic, or it can be enabled/disabled by the vehicle occupant using a button, a program, a switch, or another input mechanism. Additionally, the operation of the seating system 500 can be done in conjunction with other functions, such as massage or pressure point relief for the vehicle occupant.

Motion of the various components within the seating systems 100, 200, 300, 400, 500 described above can be provided by a combination of mechanical, pneumatic, or other motion-inducing systems. During rapid adjustments, any electric drive motors can be overdriven (for example, by increasing the drive current over typical actuation current) to enable quickly reaching the desired spring rates, inflation levels, etc. in order to dampen input vibration, counteract upcoming or current vehicle motion such as pitch, roll, and yaw, and position the vehicle occupant to improve comfort and reduce motion sickness.

Figure 6:
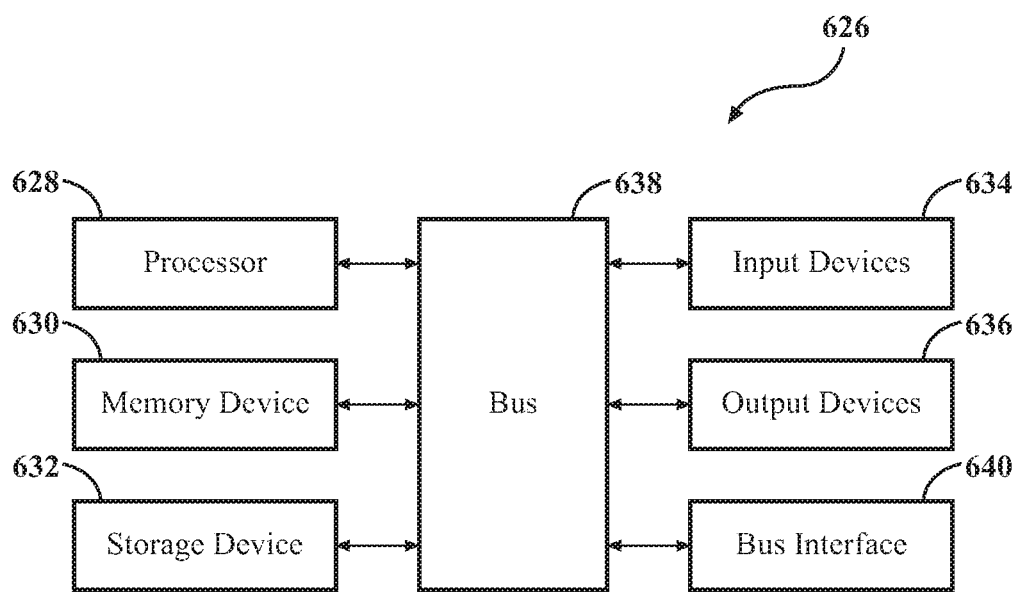
FIG. 6 is a block diagram of an example of a computing device.

FIG. 6 is a block diagram of an example of a computing device 626. The computing device 626 can be a single computing device or a system that includes multiple computing devices working cooperatively. As an example, the computing device 626 could be a vehicle-based computing device such as the control units 210, 310, 410, 510 or a vehicle ECU that sends commands to various components of the seating systems 100, 200, 300, 400, 500 in the above-described embodiments. Alternatively, the computing device 626 could be a desktop computer, a laptop computer, a tablet, or a mobile device such as a smart phone.

In the illustrated example, the computing device 626 includes a processor 628, a memory device 630, a storage device 632, one or more input devices 634, and one or more output devices 636 which are interconnected by a bus 638. The computing device 626 can also include a bus interface 640 for connecting peripheral devices to the bus 638.

The processor 628 can be any type of device that is able to process or manipulate information, including devices that are currently known and devices that may be developed in the future. As an example, the processor 628 can be a conventional central processing unit (CPU). Although the illustrated example shows a single processor, multiple processors can be used instead of a single processor.

The memory device 630 can be used to store information for immediate use by the processor 628. The memory device 630 includes either or both of a random access memory (RAM) device and a read only memory (ROM) device. The memory device 630 can be used to store information, such as program instructions that can be executed by the processor 628, and data that is stored by and retrieved by the processor 628. In addition, portions of the operating system of the computing device 626 and other applications that are being executed by the computing device 626 can be stored by the memory device during operation of the computing device 626.

The storage device 632 can be used to store large amounts of data persistently. As examples, the storage device 632 can be a hard disk drive or a solid state drive.

The input devices 634 can include any type of device that is operable to generate computer interpretable signals or data in response to user interaction with the computing device 626, such as physical interaction, verbal interaction, or non-contacting gestural interaction. As examples, the input devices 634 can include one or more of a keyboard, a mouse, a touch-sensitive panel with or without an associated display, a trackball, a stylus, a microphone, a camera, or a three-dimensional motion capture device.

The output devices 636 can include any type of device that is able to relay information in a manner that can be perceived by a user. As examples, the output devices 636 can include one or more of an LCD display screen, an LED display screen, a CRT display screen, a printer, an audio output device such as a speaker, or a haptic output device. In some implementations, the output devices 636 include a display screen and the input devices 634 include a touch sensitive panel that is integrated into the display screen to define a touch-sensitive display screen.

The bus 638 transfers signals and/or data between the components of the computing device 626. Although depicted as a single bus, it should be understood that multiple or varying types of buses can be used to interconnect the components of the computing device 626. The bus interface 640 can be any type of device that allows other devices, whether internal or external, to connect to the bus 638. In one implementation, the bus interface 640 allows connection to a controller area network (CAN) bus of a vehicle.

What is claimed is:

1. A seating system for a vehicle, comprising:
a support surface formed by first springs having fixed stiffness values;
a frame;
second springs having adjustable stiffness values and directly coupling the first springs and the frame, wherein the second springs include buckling elements and actuators operable to compress and decompress the buckling elements; and
a control unit operable to send commands to the actuators to adjust the adjustable stiffness values of the second springs by compressing and decompressing the buckling elements, wherein the first springs and the second springs together control motion of the support surface in relation to motion of the frame.

2. The seating system of claim 1, wherein the support surface is at least one of a seat base or a seat back.

3. The seating system of claim 1, wherein the first springs are leaf springs extending generally in series and parallel to form the support surface.

4. The seating system of claim 1, wherein the second springs have negative stiffness values.

5. The seating system of claim 1, wherein the control unit sends commands based on output signals from sensors.

6. The seating system of claim 5, wherein the sensors are operable to generate output signals based on at least one of vibration information, vehicle information, occupant information, or external environment information.

7. The seating system of claim 1, further comprising:
a cushion including bolsters having adjustable inflation levels, wherein the cushion is coupled to the first springs forming the support surface and wherein a surface contour of the support surface is further formed by the cushion.

8. The seating system of claim 7, further comprising:
a control unit operable to send commands to adjust the inflation levels of the bolsters and the adjustable stiffness values of the second springs.

9. The seating system of claim 8, wherein the control unit sends commands to adjust the inflation levels of the bolsters and the adjustable stiffness values of the second springs based on output signals from sensors.

10. The seating system of claim 9, wherein the sensors are operable to generate output signals based on at least one of vibration information, vehicle information, occupant information, or external environment information.

11. A seating system for a vehicle, comprising:
first springs forming a support surface;
a cushion coupled to the support surface and including bolsters having adjustable inflation levels;
a frame; and
second springs having adjustable stiffness values directly coupling the first springs and the frame,
wherein the bolsters, the first springs, and the second springs together dampen vibration passed from the frame to a vehicle occupant seated on the support surface.

12. The seating system of claim 11, wherein the second springs are spring systems having negative stiffness values, the spring systems each comprising:
buckling elements in series with a first compressible spring and an anchor and in parallel with a second compressible spring supporting the support surface; and
an actuator operable to compress and decompress the first compressible spring and the buckling elements in response to commands from a control unit,
wherein motion of the buckling elements actively tunes resonant vibration frequencies to dampen vibrations passed from the frame to the vehicle occupant seated on the support surface.

13. The seating system of claim 11, further comprising:
sensors operable to generate output signals based on at least one of vibration information, vehicle information, occupant information, or external environment information; and
a control unit operable to send commands to adjust the inflation levels of the bolsters and the adjustable stiffness values of the second springs based on the output signals.

14. The seating system of claim 11, wherein the support surface has a surface contour formed by the first springs, wherein the first springs have fixed stiffness values, and wherein the first springs having fixed stiffness values further control motion of the support surface in relation to motion of the frame.

15. The seating system of claim 14, wherein the first springs having fixed stiffness values are leaf springs extending generally in at least one of series or parallel to form the support surface.

16. A seating system for a vehicle, comprising:
first springs having fixed stiffness values, the first springs extending in parallel to form a support surface of a seat base or a seat back, the first springs having spring surfaces that support a vehicle occupant;
second springs having adjustable stiffness values, the second springs directly coupling the first springs and a frame;
a sensor operable to generate an output signal based on at least one of vibration information, vehicle information, occupant information, or external environment information; and a control unit operable to send a command to adjust the adjustable stiffness values of the second springs based on the output signal from the sensor.

17. The seating system of claim 16, wherein the second springs have negative stiffness values, the second springs each comprising:
   buckling elements in series with a first compressible spring and an anchor and in parallel with a second compressible spring supporting the first springs forming the support surface; and
   an actuator operable to compress and decompress the first compressible spring and the buckling elements in response to commands from the control unit.

18. The seating system of claim 16, further comprising:
   a cushion including bolsters having adjustable inflation levels, the cushion coupled to the first springs forming the support surface with a surface contour of the seat base or the seat back further formed by the cushion.

19. The seating system of claim 18, wherein the control unit is operable to send commands to adjust the inflation levels of the bolsters based on the output signal from the sensor.

20. The seating system of claim 16, wherein the first springs are leaf springs further extending generally in series and parallel to form the support surface.

* * * * *